March 26, 1946.  T. B. MONTGOMERY ET AL  2,397,152
CONTROL SYSTEM
Filed Dec. 18, 1943
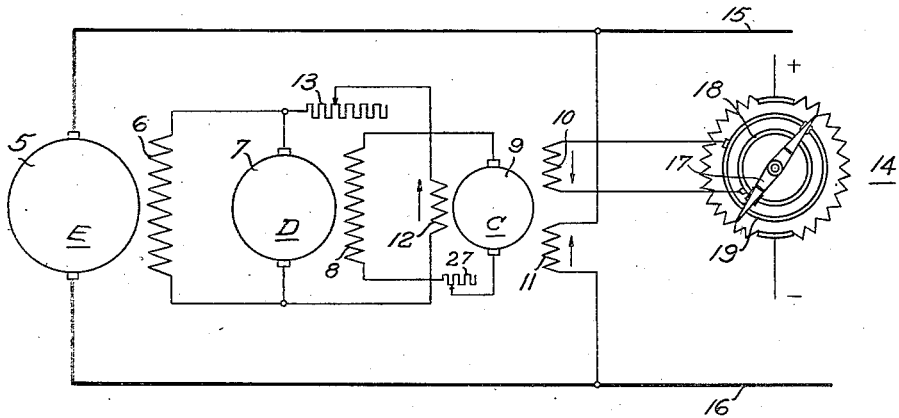
Fig. 1
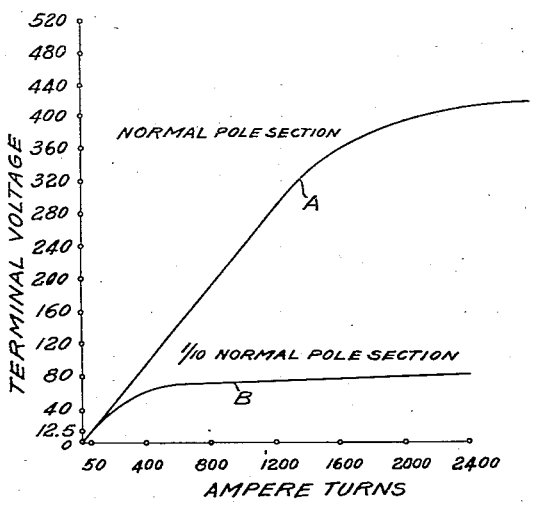
Fig. 2
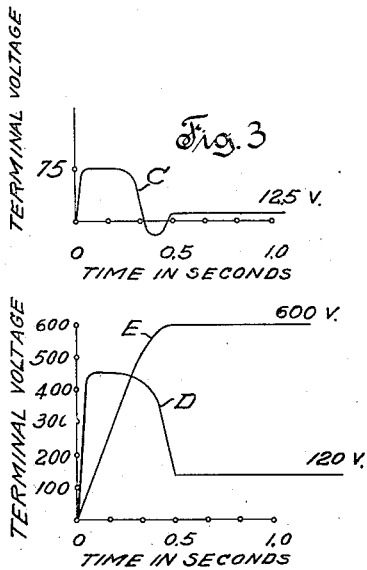
Fig. 3
Fig. 4
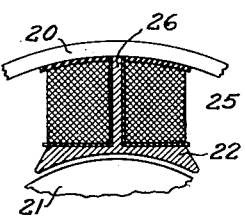
Fig. 5
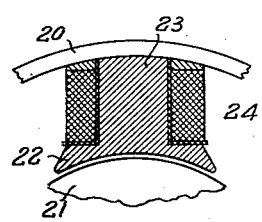
Fig. 6
Inventors
T. B. Montgomery
C. O. Weilbaecher
by Harold S. Silver
Attorney Patented Mar. 26, 1946

2,397,152

UNITED STATES PATENT OFFICE 2,397,152

CONTROL SYSTEM

Terryl B. Montgomery, Wauwatosa, and Chester O. Weilbaecher, West Allis, Wis., assignors to Allis-Chalmers Manufacturing Company, Milwaukee, Wis., a corporation of Delaware Application December 18, 1943, Serial No. 514,796

11 Claims. (Cl. 171—312)

This invention relates in general to electrical control systems and apparatus and relates particularly to a system utilizing a dynamoelectric machine for controlling a characteristic of an electrical device so that such characteristic conforms to a predetermined set of values and further controlling such device to provide for rapid change of the regulated characteristic from one set of predetermined values to another.

In many systems involving regulation of an electrical device to conform to a predetermined set of values, it is desirable to rapidly change the set of values and to bring the system into regulating action at the new set of values in minimum time and without overshooting the new mark. The electrical devices controllable by such a dynamoelectric machine are exemplified by motors, generators, lifting magnets and similar devices and the characteristics that are controllable including current, voltage, frequency, power, speed, torque, pull, and similar characteristics.

In prior art control systems of this general type, the problems of sensitivity, rapid response and hunting were always present. If a system was made sufficiently sensitive to provide good regulation, such system was inherently susceptible to hunting. Likewise if a system was damped to prevent overshooting when the regulated values were changed to a new set of values, such damping was obtained at the expense of the sensitivity or speed of response to the system. When an antihunt or recall action has been applied to regulating apparatus in a control system, such recall action was initiated simultaneously with the initiation of the regulating action, thereby preventing unimpeded corrective regulating action and maximum rate of response.

It is therefore an object of the present invention to provide a system avoiding the above disadvantages and in which overshooting is prevented while maintaining sensitivity required for accurate regulation.

It is a further object of the present invention to utilize in a control system, a dynamoelectric machine provided with a transiently saturable magnetic circuit.

It is also an object of the present invention to utilize a dynamoelectric machine in a control and regulating system whereby an unimpeded force is available to produce a rapid change in the set of values to which such system is regulating and further to apply a recall action effective to nullify such forcing only when the new set of values has been closely approached.

It is also an object of the present invention to utilize in a control system for a generator, a dynamoelectric machine operable to regulate the voltage or current of such generator with great accuracy and high amplification during normal regulating operation, yet providing for rapid change in the preset values to which such voltage or current is regulated, without overshooting the new values.

It is also an object of the present invention to provide a control system wherein the maximum permissible forcing effort (and a damping effort proportional thereto) are available to change the controlled quantity independently of the magnitude of the desired change.

Objects and advantages other than those above set forth will be apparent from the following description when read in connection with the accompanying drawing, in which:

Fig. 1 is a schematic diagram of connections of a control system embodying the present invention;

Figs. 2, 3 and 4 show characteristic curves of the machines shown in Fig. 1; and Figs. 5 and 6 are sectional views of pole sections of the machines shown in Fig. 1.

In the control system shown in Fig. 1, the electrical device controlled is shown as a generator 5 connected to conductors 15 and 16 which may lead to a load such as a motor (not shown). The generator 5 has a field 6 energized from an exciter 7. The voltage of exciter 7 is controlled by varying the terminal voltage of a control exciter 9 connected in circuit with the field 8 of the exciter 7. The voltage of generator 5 is regulated to a predetermined set of values and such set of values is changed by control of control exciter 9.

The control exciter 9 has a main pole section which as shown in Fig. 5 is about one-tenth that of a normal main pole section for a machine of its size. A normal pole section, such as would be used on machine 7, is shown in Fig. 6. By reason of the reduced cross-sectional area of one portion of the magnetic circuit, the control exciter 9 is easily saturated at normal voltages over the greater portion of the excitation range of the exciter. Control exciter 9 is energized by the difference between two fields 10 and 11, the field 10 being energized in accordance with manual manipulation of a reversing switch 14 and the opposed field 11 being energized in the example shown by connection across the conductors 15, 16. The field 10 is therefore used as a setting field to initiate a voltage change and the field 11 is a balancing field. A recall field 12 on control exciter 9 is shown energized responsively to the voltage of machine 7, and its action is also opposed to the setting field 10.

The control switch 14 is a potentiometer device illustrative of a means whereby current may be supplied to the field 10 in varying amount and direction from the constant voltage direct current source shown. When the arm 17 of the switch 14 is in the horizontal position, no voltage is applied to setting field 10. The ends of the switch arm 17 are insulated from each other. One end connects one resistance segment to the inner ring 18 and the other end of the switch member 17 connects the outer ring 19 to the other resistance segment. Rings 18 and 19 are connected to setting field 10. The direct current source of constant voltage (indicated by + and —) is connected between the resistance segments as shown. Movement of the switch member 17 from a horizontal position in a clockwise direction increases current in setting field 10 from zero in a predetermined direction, and movement of the switch member 17 from a horizontal position in a counterclockwise direction increases current from zero in the opposite direction through setting field 10.

The magnetization curve of control exciter 9 is shown by curve B in Fig. 2. If control exciter 9 had a normal pole section as in Fig. 6, its magnetization curve would be as shown on curve A of Fig. 2, which shows the curve of a conventional machine such as exciter 7. By reason of the reduced pole section, and as shown by the curve B, the terminal voltage of control exciter 9 is substantially constant over the major portion of its voltage range, that is, for all values of excitation between about 400 ampere turns and 2400 ampere turns. As balancing field 11 and recall field 12 both oppose setting field 10, the net value of excitation on control exciter 9 is the excitation supplied by field 10 minus the excitation supplied by fields 11 and 12.

Under steady-state conditions and with the switch 14 in the position as shown, the voltage of machine 5 will be maintained constant at a value determined by the net excitation on control exciter 9. Under such steady-state condition, control exciter 9 needs comparatively little excitation to supply the voltage necessary for full voltage on generator 5. Thus as a regulator, control exciter 9 is working on the portion of its saturation curve that provides the greatest sensitivity and highest amplification, that is, where the slope of the curve is greatest and, therefore, a relatively great change in terminal voltage is effected for a relatively small change in net excitation. In the example illustrated, a net excitation of about 50 ampere turns produces a terminal voltage of 12.5 volts on control exciter 9, which is sufficient under steady state conditions to maintain the desired voltage of 600 volts on generator 5.

Operation of the switch 14 in either direction will provide an extremely rapid change in voltage of the machine 5. If the switch arm 17 be moved from the zero or horizontal position to the position shown, maximum voltage at the terminals of control exciter 9 will be produced almost immediately. Such terminal voltage is much greater than that necessary to maintain normal excitation on exciter 7 and therefore a much greater than normal voltage immediately is produced at the terminals of exciter 7. The rise of current in field 6 is somewhat slower as this field has a higher inductance than the smaller exciter fields.

As voltage appears across the terminals of exciter 7, recall field 12 is energized in opposition to setting field 10, thereby reducing somewhat the net excitation on control exciter 9, but causing no substantial change in its terminal voltage, as shown by the flat saturation curve B. As voltage is built up on conductors 15, 16, balancing field 11 is energized thereby decreasing the net excitation on control exciter 9. However, it will be noted from curve B that maximum forcing voltages are maintained on exciters 9 and 7 until the net excitation on control exciter 9 is relatively small and the voltage of machine 5 is almost normal.

This is also evident from curves C, D and E in Figs. 3 and 4 and these curves also graphically illustrate the fact that as the voltage of generator 5 approaches normal, the net excitation on control exciter 9 becomes zero and then reverses before coming to its steady-state value. This permits reduction of the forcing voltage on exciter 7 and discharge of the additional energy stored in field 8 by the forcing voltage.

The following is an example of the above operation with specific values of excitation and voltage. If the switch member 17 is moved from the horizontal or zero position to a vertical position, about 2400 ampere turns excitation is supplied by the field 10. As there would be zero voltage across conductors 15 and 16 and across exciter 7 at zero position of the switch 14, no excitation would be supplied to control exciter 9 by the fields 11 and 12, and therefore the net excitation supplied to control exciter 9 would be 2400 ampere turns. As this net excitation is many times that necessary to produce the normal 600 volts on generator 5, the extra or forcing excitation must be removed at the instant the desired voltage is reached or such voltage will become too great and hunting will result.

As shown on the curves of Figs. 2, 3 and 4, an excitation of 2400 ampere turns will produce about 75 volts at the terminals of control exciter 9 which acting on field 8 of the exciter 7, produces about 450 volts at its terminals. Field 12 is designed so that for 450 volts on exciter 7, field 12 will produce an excitation of about 300 ampere turns in control exciter 9. As the recall field 12 opposes that of the setting field 10, this immediately reduces the net excitation on control exciter 9 to about 2100 ampere turns.

But as shown by curve B of Fig. 2, a reduction of 300 ampere turns excitation does not materially change the terminal voltage of control exciter 9. As the voltage across the conductors 15, 16 rises, the excitation produced by balancing field 11 increases proportionately and the net excitation of control exciter 9 decreases. However, as can be seen from curve B of Fig. 2, this reduction of net excitation has little effect on the terminal voltage of control exciter 9 until such net excitation is reduced below 600 ampere turns. At the time the net excitation of control exciter 9 is reduced below 600 ampere turns, the voltage of the generator 5 has nearly reached its normal value and the terminal voltage of exciter 7 is still close to its maximum of 450 volts. This is evident from the curves C, D and E showing the relative time relations of the voltages of machines 9, 7 and 5. These machines have also been marked C, D and E to aid in relating these curves. The terminal voltage of exciter 7 starts falling off only after the voltage of machine 5 is about 550 volts.

The extra forcing voltage of the exciter 7 (about 330 volts) must now be dissipated quickly. As the voltage on conductors 15, 16 increases and reduces the net excitation of control exciter 9 by action of balancing field 11, the terminal voltage of control exciter 9 breaks sharply and is reduced to zero very rapidly.

Because of the high forcing voltage that has been utilized to obtain rapid control of the generator 5, considerable excess energy has been stored in field 8. This excess stored energy must be dissipated before steady-state condition can be reached. Suppose, for example, that 300 ampere turns remain in recall field 12 at the time the voltage on the field 11 has risen sufficiently so that field 11 supplies 2100 ampere turns. The net excitation on control exciter 9 is therefore 2400—2100—300=0. This is the point where the curve C crosses the horizontal axis in Fig. 2. As there is zero excitation on control exciter 9, zero voltage is delivered at its terminals. Obviously further increase in the voltage across conductors 15, 16 increases the excitation of field 11, thereby reversing the voltage of control exciter 9 and permitting field 9 to discharge its stored energy. With increase of voltage of the generator 5 to 600 volts, the excitation supplied by field 11 is increased until the net excitation of control exciter 9 is just sufficient to maintain the voltage of machine 5 at the steady-state value of 600 volts.

When a change is instituted in the setting field 10 by reason of movement of the switch 14, a forcing voltage of great magnitude is projected on the field winding 6. A recall action opposed to that of setting field 10 and proportional to the forcing voltage applied, is projected back on control exciter 9. This recall action, however, does not become effective until the desired voltage corresponding to the position of the switch 14 is very closely approached. The forcing voltage is removed and made substantially zero by the time the desired voltage is attained thus preventing over-shooting.

The use of the transiently saturated control exciter 9 with its recall field 12 therefore permits regulating operation, by means of the fields 10 and 11, on the straight portion of the saturation curve which is the portion of the curve having a maximum slope and therefore giving the greatest amplificatoin and the greatest accuracy. No loss of this steady-state accuracy is effected by use of the transient saturation with its great advantages during the change period. These advantages include a high forcing voltage substantially independent of the magnitude of the transient differential between setting field 10 and balancing field 11, while at the same time maintaining a consistent damping due to the action of recall field 12. Both the forcing action and the damping action are substantially independent of the magnitude of the transient change desired in the voltage of machine 5. This provides for change in voltage of generator 5 at the maximum permissible rate (about 1200 volts per second in the example given) independently of the magnitude of the desired change. Thus any change is effected at maximum rapidity but also with unvarying safety to the machine windings.

In utilizing a control exciter having a reduced pole section, but otherwise of standard design, as shown in Fig. 5, other advantages are gained. The decreased pole section provides greater field winding space 25, which will permit greater excitation. For example, if in an exciter of usual design with pole sections as in Fig. 6, 2400 ampere turns is the maximum setting value as limited by heating, in an exciter designed in accordance with Fig. 5, a maximum setting value of 3600 ampere turns is feasible, which results in greater amplification in the lower voltage range where the control exciter is used as a regulator.

Also, in a normal machine, a given space is allotted to the field winding assembly of winding copper and pole section iron. The total cross-sectional area of the main pole assembly is limited, in a given size machine frame, by the space requirements of the interpole and interpole winding and by the need of a given amount of clearance for air passage between the interpole winding and the main winding. By greatly increasing the ratio of winding copper area to pole section iron area, a transiently saturable exciter is obtained in which the winding copper is increased in the order of 50% without increasing frame size, pole length or otherwise increasing the cost of the exciter.

In the example illustrated, a generator is shown as the device controlled and the voltage thereof is the regulated characteristic. The generator 5 could as well be a motor, a magnet, a rectifier or other similar electrical device having a characteristic to which the control exciter 9 can be made responsive. If the controlled device is a motor, the field 11 would be made responsive to current in field 6, a measure of motor speed (for example, a tachometer generator on the motor shaft) or a torque measuring device, etc., depending upon whether voltage, speed, torque, or other motor characteristic is being regulated. If a magnet current is controlled, field 11 could be made responsive to a measure of pull. If a rectifier grid voltage is controlled, field 11 could be made responsive to load current. Many other examples of controlled devices and characteristics will be apparent to those skilled in the art. In the embodiment described and shown, the machine 7 has been referred to as an exciter, however this machine may be a generator utilized for any purpose other than supplying excitation for a dynamoelectric machine.

In practicing this invention it may be desirable to add another or several stages of amplification between control exciter 9 and the exciter 7. In any such train of machines, it is desirable that recall field 12 of control exciter 9 be energized from the voltage of the final stage of amplification. While the source of energization of field 6 has been illustrated as an exciting generator, such source may be any source of variable voltage controllable by control exciter 9. The invention described herein is especially applicable to a Ward-Leonard control system for reversing a large motor such as is used on reversing blooming or slabbing mills. This control may be applied to the generator of such system for generator voltage control, to the motor of such system for field strength control or to a combination of both generator voltage and motor field strength control.

Although in the illustrative embodiment of the invention the voltage of control exciter 9 is shown as reversing in order to dissipate the stored energy in field 8 and to nullify the forcing voltage of exciter 7, in systems where machine sizes are smaller or the time available for change in generator voltage is greater, the voltage of control exciter 9 need not necessarily reverse.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system for an electrical device, a source of variable voltage connected to supply electrical energization to said electrical device, a control exciter connected to vary the voltage of said source, said control exciter having a main magnetic circuit of a cross-sectional area substantially less at one portion thereof than at other portions thereof whereby said control exciter is transiently saturable over the greater portion of the excitation range thereof, and field excitation means on said control exciter energized in accordance with a characteristic of said electrical device.

2. In a control system for an electrical device, a source of variable voltage connected to supply energization to said electrical device, a control exciter connected to vary the voltage of said source, field excitation means on said control exciter energized in accordance with a characteristic of said electrical device, a second field excitation means on said control exciter energized to a preset value, and means including a magnetic circuit for said control exciter comprising a pole and a pole face, said pole having a cross-sectional area of the order of one-tenth the area of said pole face whereby said control exciter is operable below the knee of the magnetization curve thereof to regulate said characteristic of said electrical device when said preset value is constant and operable above the knee of the magnetization curve thereof during change in said preset value.

3. In a multi-stage amplification system for control of an electrical device, a source of variable voltage connected to supply energization to said electrical device, a control exciter transiently saturable over a substantial portion of the excitation range thereof and connected to vary the voltage of said source, field excitation means on said control exciter energized in accordance with a characteristic of said electrical device, a second field excitation means on said control exciter energized to a preset value, and a third field excitation means on said control exciter energized proportionally to the voltage of said source.

4. In a multi-stage amplification system for controlling a characteristic of an electrical device, a source of variable voltage connected to supply electrical energization to said electrical device, a transiently saturable control exciter connected to vary the voltage of said source, and means including field excitation means for said control exciter for applying a forcing voltage to rapidly change said characteristic from one preset value to another preset value and for applying damping action to nullify said forcing voltage, said forcing voltage and damping action being substantially independent of the magnitude of the change in said characteristic.

5. In a multi-stage amplification system for controlling a characteristic of an electrical device, an exciting generator connected to supply energization to said electrical device, a control exciter connected to supply field excitation to said exciting generator, and means including field excitation means on said control exciter for applying a forcing voltage to said generator to rapidly change said characteristic of said electrical device from one preset value to another preset value and for applying a damping action to nullify said forcing voltage, and means including means for transiently saturating the magnetic circuit of said control exciter whereby said damping action is ineffective until said characteristic of said electrical device is substantially at said changed value.

6. In a control system for a dynamo electric machine, an exciting generator connected to supply field excitation to said dynamo electric machine, a control exciter connected to supply field excitation to said exciting generator, said control exciter being of conventional design except that the main pole sections thereof are reduced to a cross-sectional area of the order of one-tenth of the area of the main pole faces, field excitation means on said control exciter energized responsively to a characteristic of said dynamo electric machine, a second field excitation means on said control exciter energized to a preset value, and a third field excitation means on said control exciter energized in accordance with the voltage of said exciting generator.

7. In a control system for a dynamo electric machine, an exciting generator connected to supply field excitation to said dynamo electric machine, a control exciter connected to supply field excitation to said exciting generator, said control exciter having a magnetic circuit comprising poles and pole faces, the cross-sectional area of said magnetic circuit being substantially less at a section through said poles than the cross-sectional area of said pole faces whereby said control exciter is operable with high amplification at small electrical loads and is operable at substantially constant output at high electrical loads, and field excitation means on said control exciter energized in accordance with a characteristic of said dynamo electric machine.

8. In a control system for a dynamo electric machine, an exciting generator connected to supply field excitation to said dynamo electric machine, a control exciter connected to supply field excitation to said exciting generator, said excitation means on said control exciter energized in accordance with a characteristic of said dynamo electric machine, additional field excitation means on said control exciter energized to a preset value, and means comprising an armature of a predetermined size for said control exciter and further comprising a magnetic circuit for said control exciter having a cross-sectional area normal for said armature size except at one portion thereof, said one portion having a cross-sectional area of the order of one-tenth said normal value whereby said control exciter is operable below the knee of the magnetization curve thereof to regulate said characteristic of said dynamo electric machine when said preset value is constant and operable above the knee of the magnetization curve thereof during change in said preset value.

9. In a multi-stage amplification system for control of a dynamo electric machine, an exciting generator connected to supply field excitation to said dynamo electric machine, a control exciter transiently saturable over a substantial portion of the excitation range thereof and connected to supply field excitation to said exciting generator, field excitation means on said control exciter energized in accordance with a characteristic of said dynamo electric machine, a second field excitation means on said control exciter energized to a preset value, and a third field excitation means on said control exciter energized proportionally to the voltage of said exciting generator.

10. In a multi-stage amplification system for controlling a characteristic of a dynamo electric machine, an exciting generator connected to supply field excitation to said dynamo electric machine, a transiently saturable control exciter connected to supply field excitation to said exciting generator, and means including field excitation means for said control exciter for applying a forcing voltage to said generator to rapidly change said characteristic from one preset value to another preset value and for applying damping action to nullify said forcing voltage, said forcing voltage and damping action being substantially independent of the magnitude of the change in said characteristic.

11. In a control system for an electrical device, a source of variable voltage connected to supply electrical energization to said electrical device, a control exciter connected to vary the voltage of said source and comprising means for saturably exciting said exciter at normal voltages over the greater portion of the excitation range thereof, said means comprising a main magnetic circuit having a cross-sectional area substantially less at one portion thereof than at other portions thereof, and winding means for energizing said main magnetic circuit energized in accordance with a characteristic of said electrical device.

TERRYL B. MONTGOMERY.
CHESTER O. WEILBAECHER.